US012125479B2

(12) United States Patent
O'Brien et al.

(10) Patent No.: US 12,125,479 B2
(45) Date of Patent: Oct. 22, 2024

(54) SYSTEMS AND METHODS FOR PROVIDING A SOCIOLINGUISTIC VIRTUAL ASSISTANT

(71) Applicant: Seam Social Labs Inc, Brooklyn, NY (US)

(72) Inventors: Tiasia O'Brien, New York, NY (US); Marisa Jean Dinko, Brooklyn, NY (US)

(73) Assignee: Seam Social Labs Inc, Brooklyn, NY (US)

(*) Notice: Subject to any disclaimer, the term of this patent is extended or adjusted under 35 U.S.C. 154(b) by 250 days.

(21) Appl. No.: 17/667,483

(22) Filed: Feb. 8, 2022

(65) Prior Publication Data

US 2022/0254337 A1     Aug. 11, 2022

Related U.S. Application Data

(60) Provisional application No. 63/147,118, filed on Feb. 8, 2021.

(51) Int. Cl.
| | | |
|---|---|---|
| *G10L 15/18* | (2013.01) | |
| *G10L 15/06* | (2013.01) | |
| *G10L 15/22* | (2006.01) | |
| *G10L 15/30* | (2013.01) | |
| *G10L 25/63* | (2013.01) | |

(52) U.S. Cl.
CPC ........ *G10L 15/1815* (2013.01); *G10L 15/063* (2013.01); *G10L 15/22* (2013.01); *G10L 15/30* (2013.01); *G10L 25/63* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,250,851 B1* | 4/2019 | Harpur | G06V 40/174 |
| 2009/0306979 A1* | 12/2009 | Jaiswal | G10L 15/063 |
| | | | 704/235 |
| 2019/0147371 A1* | 5/2019 | Deo | G06N 20/20 |
| | | | 706/12 |
| 2020/0342895 A1* | 10/2020 | Jung | G10L 15/26 |
| 2021/0104241 A1* | 4/2021 | Doggett | G10L 15/24 |
| 2021/0134263 A1* | 5/2021 | Schiller | G10L 13/00 |
| 2022/0076668 A1* | 3/2022 | Carbune | G10L 15/063 |
| 2022/0188361 A1* | 6/2022 | Botros | G02B 27/01 |

* cited by examiner

*Primary Examiner* — Stella L. Woo

(57) ABSTRACT

A system for providing a sociolinguistic virtual assistant includes a communication device, a processing device, and a storage device. The processing device being configured to process input data using a natural language processing algorithm; categorize the semantic data based on psychsociological categorizations associated with the at least one user; analyze the command from the at least one user to identify a task associated with the command; generate a response based on identification of the task associated with the command; execute the task associated with the command using categorized semantic data, to derive a result. A method corresponding to the system is also provided.

15 Claims, 6 Drawing Sheets

SYSTEMS AND METHODS FOR PROVIDING A SOCIOLINGUISTIC VIRTUAL ASSISTANT

FIELD OF THE INVENTION

The present invention relates generally to the field of data collection, processing, and analysis. More specifically, the present invention includes methods and systems for providing a sociolinguistic virtual assistant.

BACKGROUND OF THE INVENTION

Existing technologies for providing a sociolinguistic virtual assistant are deficient with regard to several aspects. For instance, current technologies do not facilitate efficient natural language processing methods to analyze low-resourced dialects from African diasporan, global migrant, or "underground or secret" communal languages yielding little to no functionality for analysis or insights on these dialects. Furthermore, current technologies do not facilitate autonomous integration of transcriptions (such as, but not limited to, voice transcriptions) associated with the unstructured qualitative data recorded in a natural environment corresponding to events such as, focus groups, presentations, surveys, etc. into a web-based application for answering queries of users that may be willing to generate the insights.

Therefore, there is a need for improved methods and systems for providing a sociolinguistic virtual assistant that may overcome one or more of the above-mentioned problems and/or limitations.

SUMMARY OF THE INVENTION

In a first aspect of the present invention, a system for providing a sociolinguistic virtual assistant is provided. The system comprises a communication device, a processing device, and a storage device. The communication device is configured to: receive input data from at least one user device associated with at least one user and transmit the input data to the processing device; receive a command from the at least one user via the at least one user device and transmit the command to the processing device. The processing device is configured to: process the input data using a natural language processing algorithm, the natural language processing algorithm being configured to generate semantic data based on the input data and perform sentiment analysis associated with the input data; categorize the semantic data based on psych-sociological categorizations associated with the at least one user; analyze the command from the at least one user to identify a task associated with the command; generate a response based on identification of the task associated with the command; execute the task associated with the command using categorized semantic data, to derive a result. The storage device is configured to store the categorized semantic data. The communication device is further configured to: transmit the response to the at least one user device; and transmit the result to the at least one user device.

In a second aspect of the present invention, a method for providing a sociolinguistic virtual assistant is provided. The method comprises the steps of receiving input data from at least one user device associated with at least one user; receiving a command from the at least one user via the at least one user device; processing the input data using a natural language processing algorithm, the natural language processing algorithm being configured to generate semantic data based on the input data and perform sentiment analysis associated with the input data; categorizing the semantic data based on psych-sociological categorizations associated with the at least one user; analyzing the command from the at least one user to identify a task associated with the command; generating a response based on identification of the task associated with the command; transmitting the response to the at least one user device; executing the task associated with the command using categorized semantic data, to derive a result; storing the categorized semantic data; and transmitting the result to the at least one user device.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose. Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
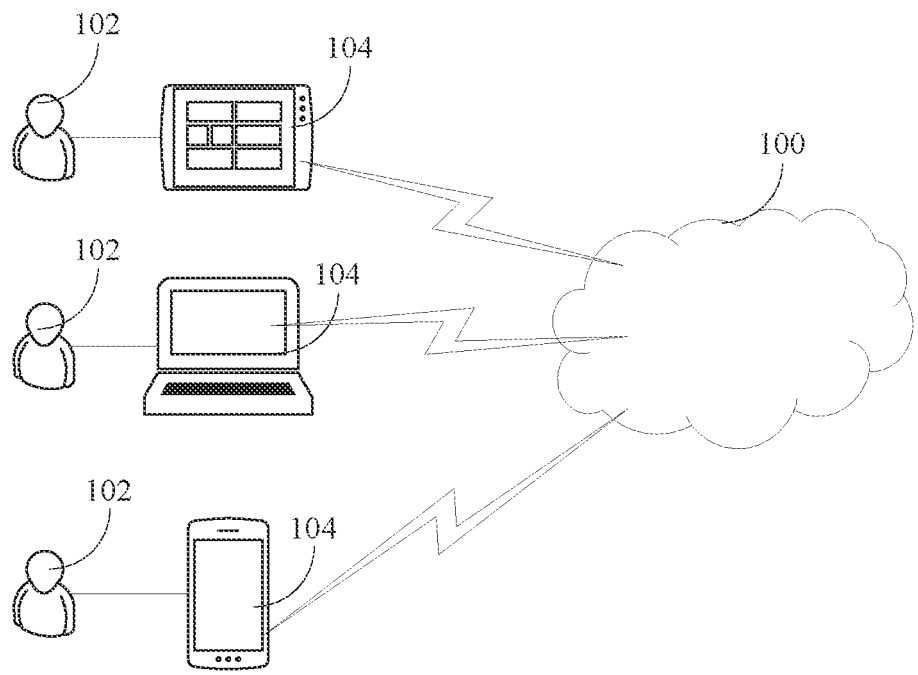
FIG. 1 schematically illustrates the architecture of an embodiment of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and system for provisioning of a market research-oriented intelligent virtual assistant, embodiments of the present disclosure are not limited to use only in this context.

In general, the method disclosed herein may be performed by one or more computing devices. For example, in some embodiments, the method may be performed by a cloud based server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a supercomputer, a mainframe computer, mini-computer, microcomputer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled, and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more, and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

The present disclosure includes methods and systems for providing a sociolinguistic virtual assistant. Further, the disclosed methods and systems aim to facilitate an intelligent virtual assistant application that may be referred to as "CODIE".

Further, the disclosed methods and systems aim to facilitate integration of the intelligent virtual assistant application disclosed herein with a web-based application. Further, the integration, in an instance, may facilitate one or more functionalities such as, but not limited to, running equity insight reports, record and/or transcribe focus groups, public hearing meetings, interviews, etc. for collecting sociolinguistic research data. Further, the web-based application may be referred to as "CO:CENSUS" developed by Seam Social Labs Inc.

Further, the disclosed methods and systems aim to facilitate collecting qualitative data and analyze voice data received from a plurality of users based on the virtual assistant application disclosed herein in order to conduct sociolinguistic analysis categorized based on culturally competent research of low-resourced dialects.

Further, the disclosed methods and systems aim to facilitate computer-implemented ethnographic and/or psych-sociological research based on the virtual assistant. Further, the virtual assistant disclosed herein may facilitate developing a mesh grid, integrating voice transcriptions into a plurality of web-based applications, and answer customer queries about data based on the collecting. Further, voice commands for the intelligent virtual assistant application, in an instance, may be based on sentiments or emotional analysis through our natural language processing method utilizing trained and verified multivariate data sources and omnidirectional conversational analysis, referred to hereinafter as 'CO:DE-FINE'.

Referring now to figures, FIG. 1 schematically illustrates the architecture of an embodiment of the present invention. At least one user 102 may access the system 100 of the present invention via at least one user device 104. By way of non-limiting example, the system 100 may be hosted on a centralized or decentralized server, such as, a cloud computing service. The system 100 may communicate with the at least one user device 104. The at least one user device 104 may be a smartphone, a laptop, a tablet computer, a desktop computer, a server computer, an all-in-one computer, a wearable computer, a purpose-built electronic device, or any other type of electronic device. The at least one user 102 may include relevant parties such as, but not limited to, end-users, administrators, service providers, service consumers, etc.

The at least one user device 104 operated by the at least one user 102 may be in communication with the system 100 of the present invention. The at least one user 102 may access the system 100 of the present invention through a web-based software application or browser. The web-based software application may be embodied as, for example, but not be limited to, a website, a web application, a desktop application, and a mobile application.

Figure 2:
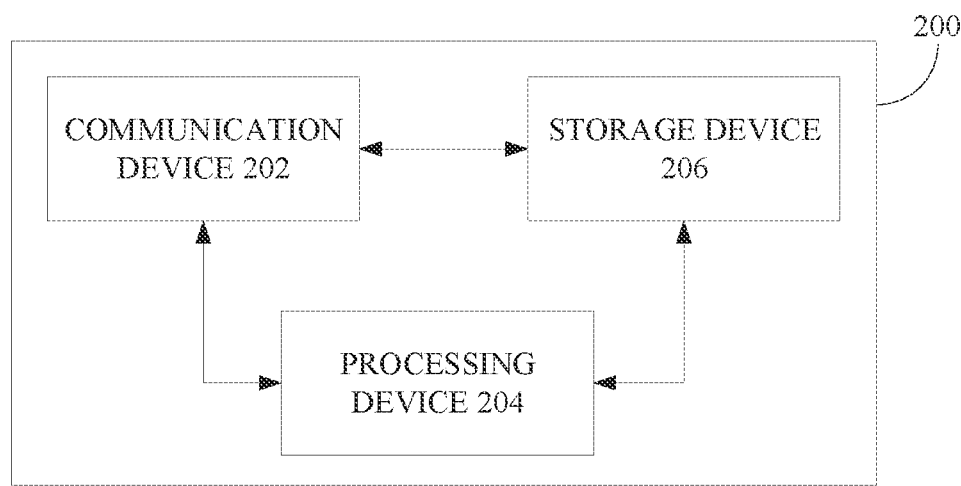
FIG. 2 is a block diagram of a system for providing a sociolinguistic virtual assistance in accordance with an embodiment of the present invention.

FIG. 2 is a block diagram of a system 200 for providing a sociolinguistic virtual assistance in accordance with an embodiment of the present invention. In one embodiment, the system 200 for providing a sociolinguistic virtual assistance comprises a communication device 202, a processing device 204, and a storage device 206. The communication device 202 may be communicatively coupled with the processing device 204. The communication device 202 may be configured to receive input data from at least one user device associated with at least one user. The input data may be received via an interaction of the at least one user with the at least one user device. the interaction may include typing, speaking, swiping, etc. Further, the at least one user device may include a microphone and one or more sensors that may be configured to capture one or more of physical variables, chemical variables, and/or biological variables. Further, the at least one user device, in an instance, may include at least one image capturing device (such as, but not limited to, a camera).

Further, the at least one user device may be configured to execute an operating system that may facilitate running of the sociolinguistic virtual assistant of the present application. Further, the operating system may include, but not limited to, iOS, Android, Windows, MacOS, Linux, etc. Further, in some embodiments, the sociolinguistic analysis intelligent virtual assistant may be integrated with one or more web-based applications installed on the at least one user device. Further, in some embodiments, the input data may be based on one or more of emails, instant messaging, discussion forums, group chat sessions, public hearing meetings, etc. Further, the input data, in one embodiment, may be based on context data corresponding to research in one or more domains such as, but not limited to, market, public, business, etc. Further, in some embodiments, the research may be based on a plurality of surveys that may be conducted among a plurality of users such as, but not limited to, online survey, telephone survey, mail survey, market analysis, community-wide survey, focus groups, and so on. Further, the plurality of surveys, in one embodiment, may include a plurality of qualitative data that may be collected from the plurality of users. Further, the plurality of qualitative data may be based on first-hand observations, questionnaires, focus groups, participants-observation, recordings (i.e., audio-visual and/or audio recordings) made in a natural environment, electronic documents, artifacts, etc. that may be obtained by the at least one user on the at least one user device. Further, in some embodiments, the interaction may control features and operations of the at least one user device based on the input data. For example, the interaction may invoke applications installed on the at least one user device, in one embodiment, based on application programming interfaces (or APIs). Further, the controlling of the features and the operations, in one embodiment, may perform functions based on the input data that may otherwise be initiated using a conventional user interface of the at least one user device. Further, the input data may include any data such as, but not limited to, one or more of speech input, textual input, gesture input, facial input, at least one electronic document, and so on. Further, in some embodiments, the input data may be based on the plurality of surveys conducted among the plurality of users. Further, each of the input data may be based on the interaction of the at least one user with the at least one user device. Further, in some embodiments, the functions may be performed as add-on functions in context of a conversational dialog between the at least one user device and the at least one user. Further, in some embodiments, the conversational dialog may be based on a plurality of languages spoken by the at least one user device. Further, each of the plurality of languages may facilitate performing of the functions and the operations corresponding to the at least one user device. In one embodiment, the input data is voice data from diasporic, migrant, or secret community sources.

The communication device 202 may be further configured to transmit the input data to the processing device 204. In some embodiments, the input data is encrypted before being transmitted to the processing device. Further, the encryption may be based on algorithms such as Advanced Encryption Standard (AES), Triple Data Encryption Standard (triple DES), RSA, Blowfish, etc.

Further, the communication device 202 may be further configured to receive a command from the at least one user via the at least one user device and transmit the command to the processing device 204. The command may be a voice command, a keypad input command, a touch input command, or a gesture input command.

The processing device 204 may be configured to process the input data using a natural language processing algorithm. The processing may be performed on the one or more of the speech input, the textual input, the gesture input, the facial input, the at least one electronic document, etc. received from the at least one user using the at least one user device. Further, in one embodiment, if the input data includes the speech input, then the speech input may be interpreted as at least one spoken word. Further, in one embodiment, if the input data includes the textual input and/or the at least one electronic document, then the input data may be interpreted as at least one written word. Further, in one embodiment, if the input data includes the facial input, then the input data may be interpreted as at least one expression.

The natural language processing algorithm may be configured to generate semantic data based on the input data and perform sentiment analysis associated with the input data. The natural language processing algorithm may perform the processing in conjunction with one or more technologies such as, but not limited to conservational software robot (or simply "bot"), web services, deep learning, etc. In one embodiment, the semantic data may include transcribed input data based on the processing and the analyzing. Further, the transcribed input data, in one embodiment, may include monitored multiple forms of input data from the plurality of users. Further, the monitoring, in one embodiment, may facilitate interpreting sentiments and interests of the plurality of users such that the at least one user may be conveyed a compiled summary of the input data. Further, the conveying, in one embodiment, may be based in any digital form such as, but not limited to, an electronic document, an audio response, an audio-visual response, etc. In one embodiment, the sentiment analysis is based on emotional and cognitive responses of the at least one user.

The processing device 204 may be further configured to categorize the semantic data based on psych-sociological categorizations associated with the at least one user. The psych-sociological categorizations may be based on personality, values, etc. of the at least one user. The categorized semantic data may be stored on the storage device 206. in some embodiments, the storage device 206 may correspond to a database associated with the one or more web-based applications.

Figure 6:
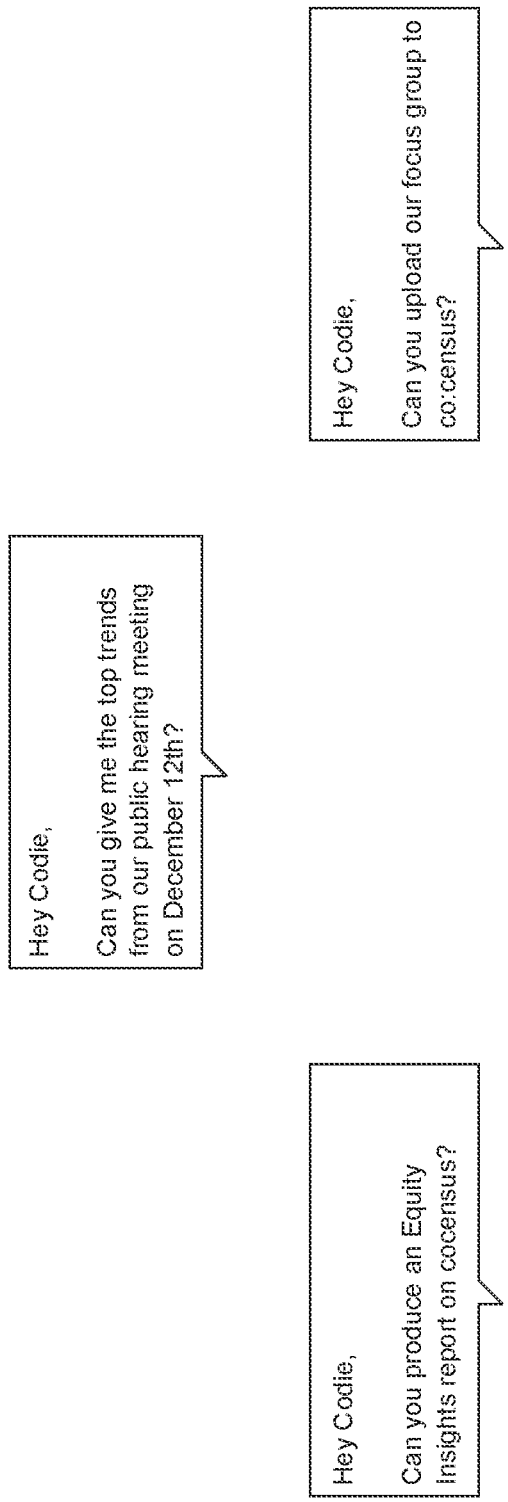
FIG. 6 is an exemplary representation of commands associated with the sociolinguistic virtual assistance in accordance with an embodiment of the present invention.

The processing device 204 may be further configured to analyze the command from the at least one user to identify a task associated with the command. For example, in the embodiment where the command is a voice command, the natural language processing algorithm can also be used to interpret the voice command so as to identify a task associated with the command. Some exemplary commands are shown in FIG. 6. For example, the at least one user may ask the sociolinguistic virtual assistant to generate an equity insights report on CO:CENSUS, retrieve top trends for the user's public hearing meeting on a specific date, or upload the user's focus group to CO:CENSUS. Once the task is identified, processing device 204 executes the task associated with the command using the categorized semantic data, to derive a result. In the meantime, a response can be generated based on identification of the task associated with the command. This response may be transmitted by the communication device 202 to the at least one user device to inform the at least one user that the task is being executed. Further, the result may be transmitted by the communication device 202 to the at least one user device such that the user can visually review the result of the task.

In one embodiment, the processing device 204 may be further configured to split the semantic data into a training data set and a validation data set, create a training model using the training data set, optimize the training model using the validation data set, and refresh the semantic data based on the optimized training model. The present invention employs the training model to process the data collected especially from diasporic, migrant, or secret community sources. In a preferred embodiment of the present invention, about three fourths of the semantic data are used to form the training data set, while about one fourth of the semantic data is used to form the validation data set. This training model allows the present invention to process low-resourced dialects.

Figure 3:
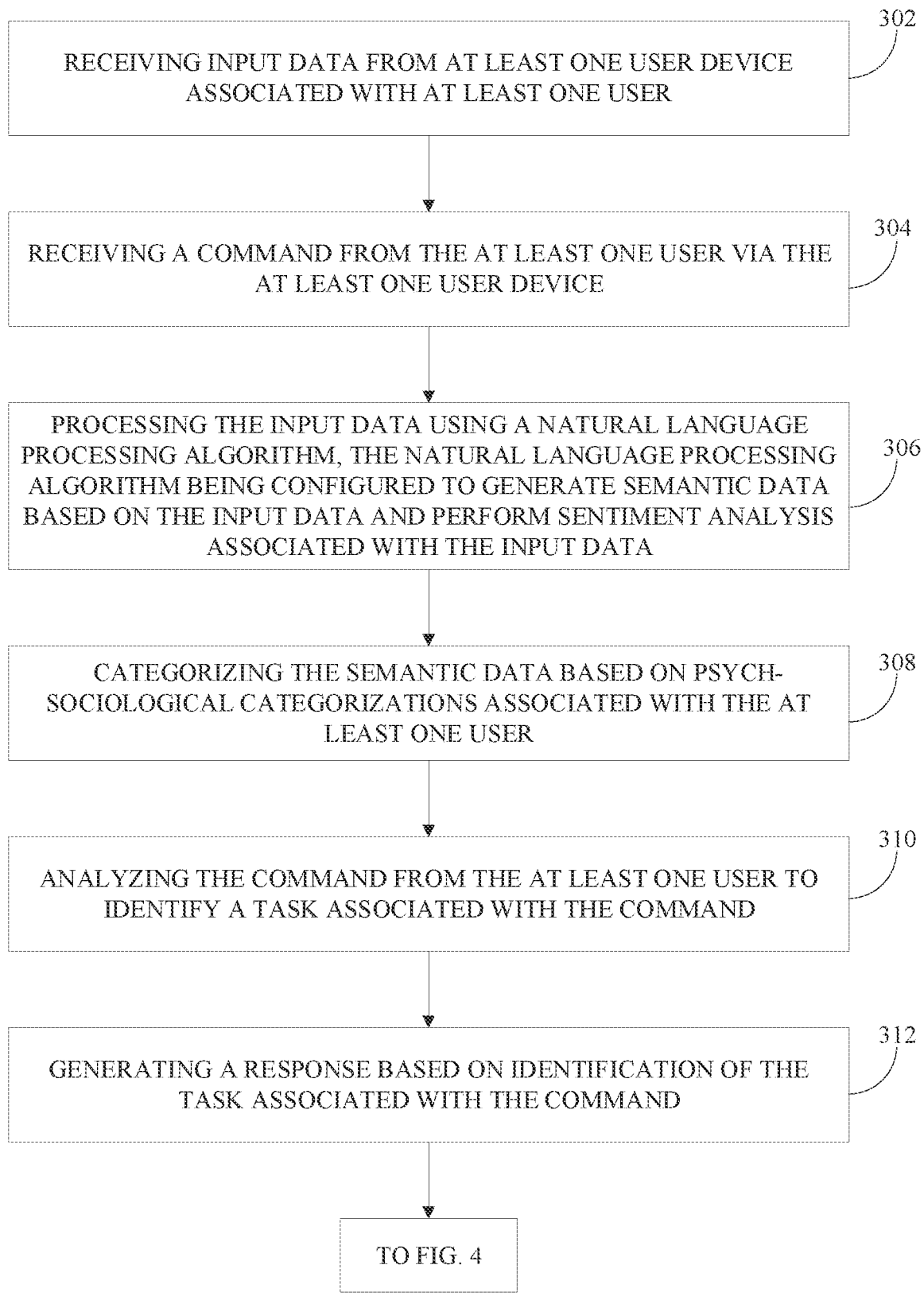
FIG. 3 is a flowchart of a method for providing a sociolinguistic virtual assistance in accordance with an embodiment of the present invention.
Figure 4:
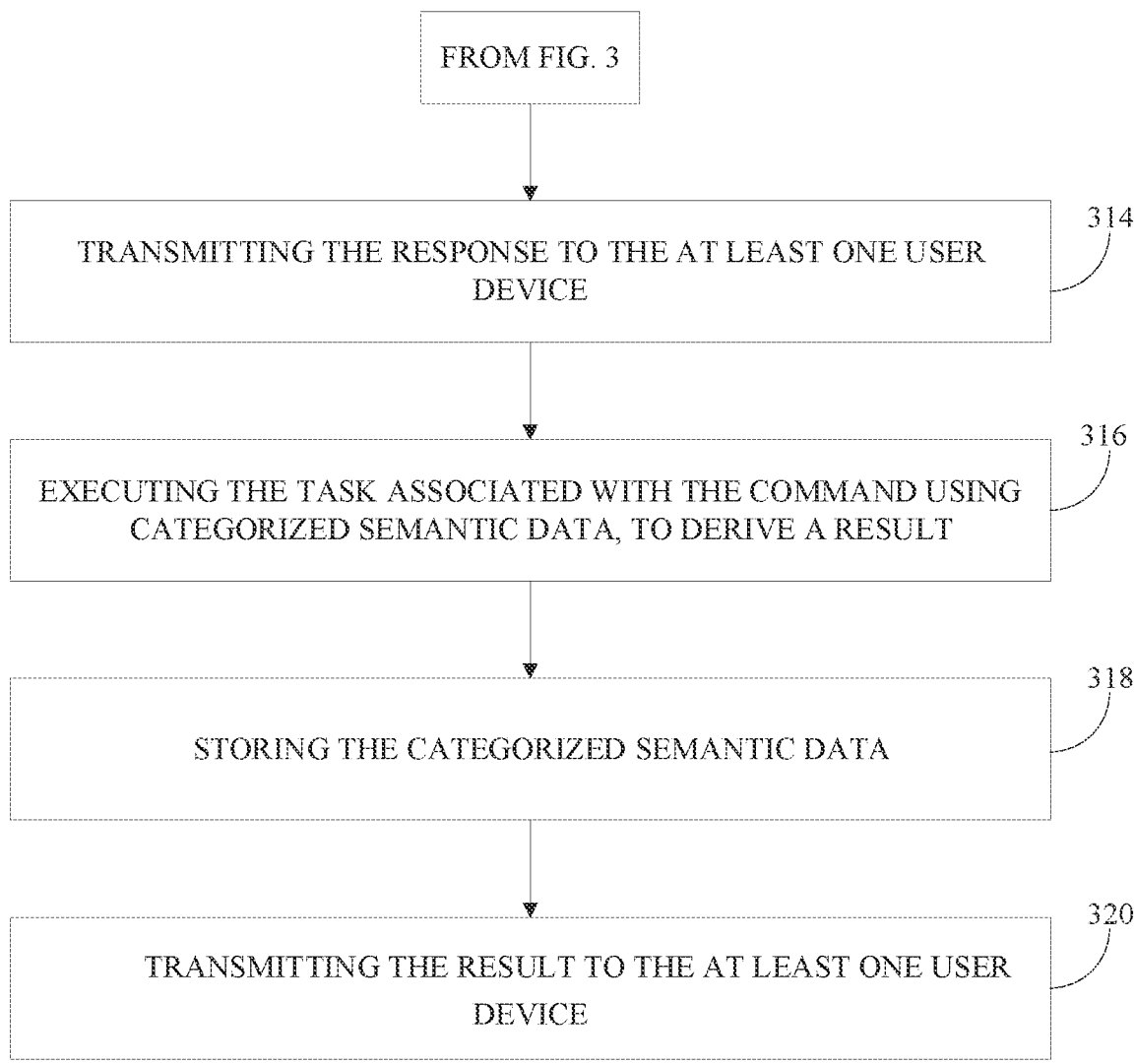
FIG. 4 is a flowchart continuing from FIG. 3.

FIGS. 3 and 4 are a flowchart of a method for providing a sociolinguistic virtual assistance in accordance with an embodiment of the present invention. At 302, the input data is received from at least one user device associated with at least one user. Preferably, the input data is voice data from diasporic, migrant, or secret community sources. The input data may be encrypted using any known technology in the art. At 304, a command is received from the at least one user via the at least one user device. The command is used to cause the virtual assistant of the present invention to complete a specific task. The input data is processed, at 306, using a natural language processing algorithm. The natural language processing algorithm is configured to generate semantic data based on the input data and perform sentiment analysis associated with the input data. Preferably, the sentiment analysis is based on emotional and cognitive responses of the at least one user. The semantic data is categorized, at 308, based on psych-sociological categorizations associated with the at least one user. In a preferred embodiment, the psych-sociological categorizations are based on personality, behavior, condition, sentiments, solution, value, etc. of the at least one user. The command from the at least one user is analyzed, at 310, to identify the task associated with the command. The command may be a voice command, a keypad input command, a touch input command, or a gesture input command. Further, a response is generated, at 312, based on identification of the task associated with the command. The response indicates that the task is being executed. The response can be visual or audible signals. The response is transmitted, at 314, to the at least one user device such that the user is notified. The task associated with the command is executed, at 316, using categorized semantic data, to derive a result. The categorized semantic data is stored, at 318, for example, in a storage device. The result is transmitted, at 320, to the at least one user device such that the at least one user are provided with the result of the task.

Figure 5:
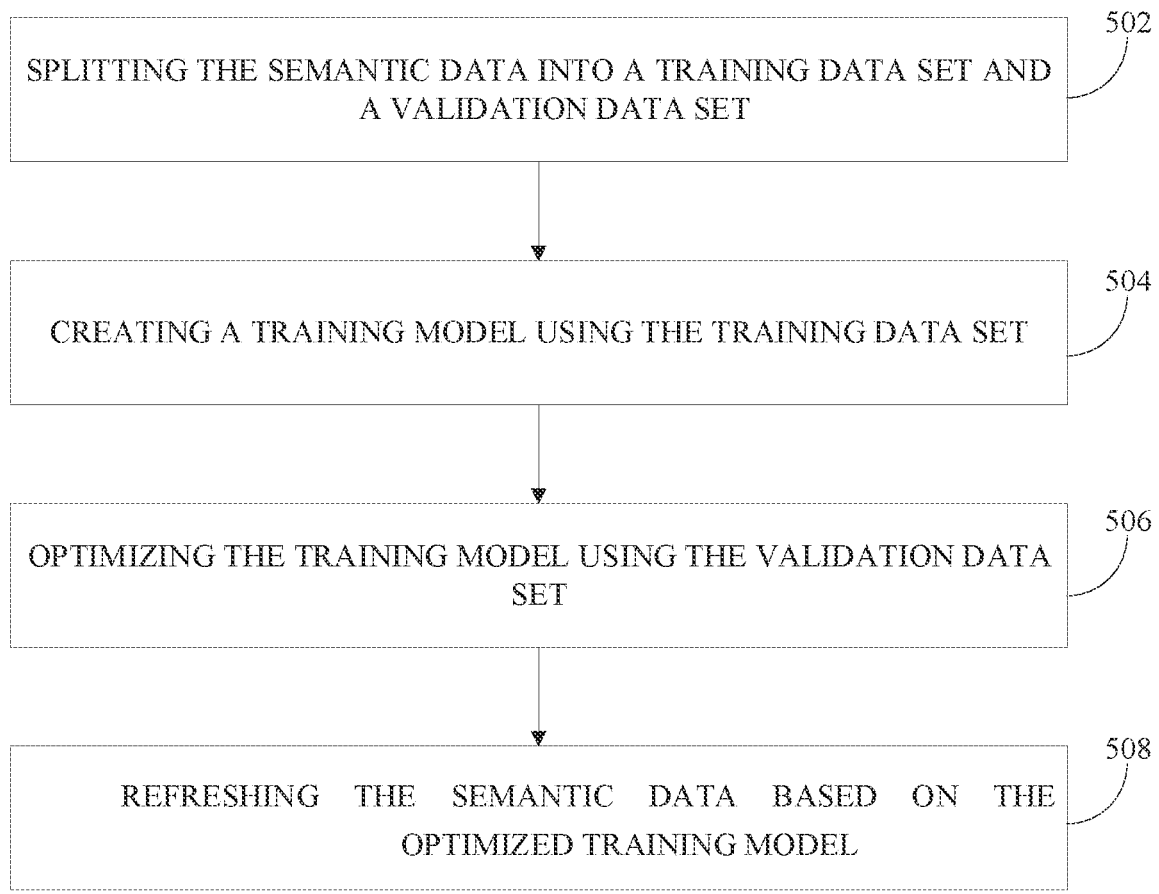
FIG. 5 is a flowchart illustrating the natural language processing method used in an embodiment of the present invention.

FIG. 5 is a flowchart illustrating the natural language processing method used in an embodiment of the present invention. Processing the input data using a natural language processing algorithm may comprise the step of splitting the semantic data into a training data set and a validation data set, at 502. A training model may be created, at 504, using the training data set. The training model may be optimized, at 506, using the validation data set. The semantic data may be refreshed, at 508, based on the optimized training model. The present invention employs the training model to process the data collected especially from diasporic, migrant, or secret community sources. In a preferred embodiment of the present invention, about three fourths of the semantic data are used to form the training data set, while about one fourth of the semantic data is used to form the validation data set.

Although the disclosure has been explained in relation to its preferred embodiment, it is to be understood that many other possible modifications and variations can be made without departing from the spirit and scope of the disclosure.

What is claimed is:

1. A system for providing a sociolinguistic virtual assistant, comprising:
   a communication device;
   a processing device;
   a storage device;
   the communication device being configured to:

receive input data from at least one user device associated with at least one user and transmit the input data to the processing device;

receive a command from the at least one user via the at least one user device and transmit the command to the processing device;

the processing device being configured to:

process the input data using a natural language processing algorithm, the natural language processing algorithm being configured to generate semantic data based on the input data and perform sentiment analysis associated with the input data, wherein the sentiment analysis is based on emotional and cognitive responses of the at least one user;

categorize the semantic data based on psych-sociological categorizations associated with the at least one user, wherein the psych-sociological categorizations are based on personality and value of the at least one user;

analyze the command from the at least one user to identify a task associated with the command;

generate a response based on identification of the task associated with the command;

execute the task associated with the command using categorized semantic data, to derive a result;

the storage device being configured to store the categorized semantic data; and the communication device being further configured to:

transmit the response to the at least one user device; and transmit the result to the at least one user device.

2. The system for providing a sociolinguistic virtual assistant as claimed in claim 1, wherein the processing device is further configured to:

split the semantic data into a training data set and a validation data set;

create a training model using the training data set;

optimize the training model using the validation data set; and refresh the semantic data based on optimized training model.

3. The system for providing a sociolinguistic virtual assistant as claimed in claim 2, wherein three fourths of the semantic data are used to form the training data set, while one fourth of the semantic data is used to form the validation data set.

4. The system for providing a sociolinguistic virtual assistant as claimed in claim 3, wherein the input data is voice data from diasporic, migrant, or secret community sources.

5. The system for providing a sociolinguistic virtual assistant as claimed in claim 1, wherein the communication device, the processing device, and the storage device are provided in a cloud computing environment.

6. The system for providing a sociolinguistic virtual assistant as claimed in claim 1, wherein the command comprises a voice command, a keypad input command, a touch input command, and a gesture input command.

7. The system for providing a sociolinguistic virtual assistant as claimed in claim 1, wherein the response indicates that the task is being executed.

8. The system for providing a sociolinguistic virtual assistant as claimed in claim 1, wherein the input data is encrypted before being transmitted to the processing device and decrypted before being processed using the natural language processing algorithm.

9. A method for providing a sociolinguistic virtual assistant, comprising the steps of:

receiving input data from at least one user device associated with at least one user;

receiving a command from the at least one user via the at least one user device;

processing the input data using a natural language processing algorithm, the natural language processing algorithm being configured to generate semantic data based on the input data and perform sentiment analysis associated with the input data, wherein the sentiment analysis is based on emotional and cognitive responses of the at least one user;

categorizing the semantic data based on psych-sociological categorizations associated with the at least one user, wherein the psych-sociological categorizations are based on personality and value of the at least one user;

analyzing the command from the at least one user to identify a task associated with the command;

generating a response based on identification of the task associated with the command;

transmitting the response to the at least one user device;

executing the task associated with the command using categorized semantic data, to derive a result;

storing the categorized semantic data; and transmitting the result to the at least one user device.

10. The method for providing a sociolinguistic virtual assistant as claimed in claim 9, wherein processing the input data using a natural language processing algorithm comprising the steps of:

splitting the semantic data into a training data set and a validation data set;

creating a training model using the training data set;

optimizing the training model using the validation data set; and refreshing the semantic data based on optimized training model.

11. The method for providing a sociolinguistic virtual assistant as claimed in claim 10, wherein three fourths of the semantic data are used to form the training data set, while one fourth of the semantic data is used to form the validation data set.

12. The method for providing a sociolinguistic virtual assistant as claimed in claim 11, wherein the input data is voice data from diasporic, migrant, or secret community sources.

13. The method for providing a sociolinguistic virtual assistant as claimed in claim 9, wherein the command comprises a voice command, a keypad input command, a touch input command, and a gesture input command.

14. The method for providing a sociolinguistic virtual assistant as claimed in claim 9, wherein the response indicates that the task is being executed.

15. The method for providing a sociolinguistic virtual assistant as claimed in claim 9, wherein the input data is encrypted after being received and decrypted before being processed using the natural language processing algorithm.

* * * * *